United States Patent Office 3,088,155
Patented May 7, 1963

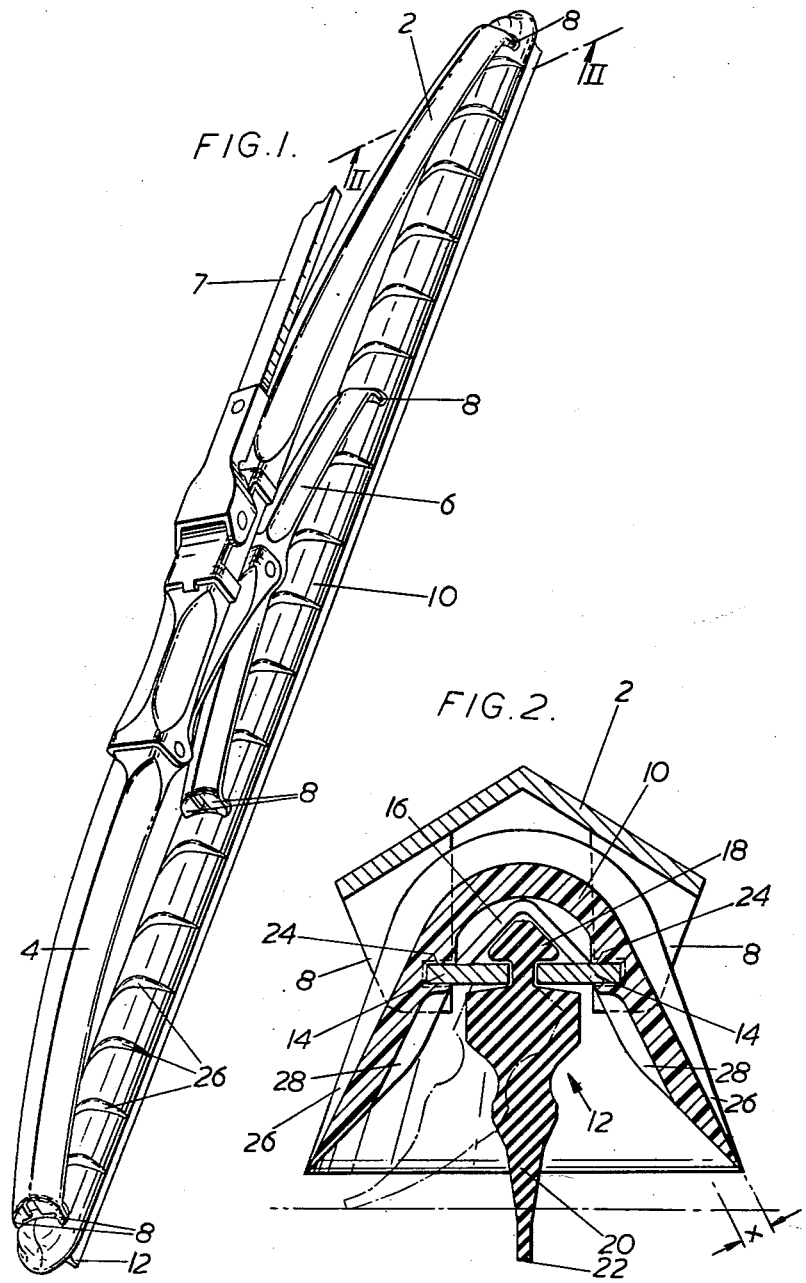

3,088,155
WINDSCREEN WIPERS
Phillip Geoffrey Kent Smithers, Ealing, England, assignor to Trico Products Corporation, Buffalo, N.Y., a corporation of New York
Filed Feb. 23, 1960, Ser. No. 10,299
11 Claims. (Cl. 15—250.42)

This invention is concerned with windscreen wipers having a wiping member of rubber-like material (which may be termed a "rubber") of which a substantial part rocks with respect to a harness for the rubber to opposite sides of a central position as a result of drag at the wiping edge during use. The rubber and harness together constitute a wiper "blade," the harness being connected to an oscillating wiper arm when in use; this invention is concerned with blades which include a backing strip for the rubber, that is to say a flexible strip lying substantially at right angles to a mean central plane through the rubber so that it is flexible towards and away from the windscreen when in use but is stiff in direction parallel to the windscreen. Rocking may, for example, be achieved by arranging that the rubber is held loosely by the backing strip, so that rocking takes place about an axis at the backing strip, or by shaping the rubber so that it has a thin neck which bends to permit rocking, the neck being between the wiping edge and a backing strip mounted securely along the back of the rubber. The rocking is desirable in order to obtain a proper wiping action.

A blade according to the present invention includes a thin self-supporting shroud of a deformable moulded material which lies along the length of the blade to shield from air flow across the windscreen of a vehicle a substantial part of the rocking part of the rubber at least on one side, and which is connected to the remainder of the blade at least in a number of longitudinally spaced positions. The shroud may serve as a shield only on one side of the rubber, in which case the blade should be used with the shielded side facing towards the centre of the windscreen when the wiper arm is upright, but preferably serves as a shield on both sides of the rubber.

When viewed from the side the shroud is preferably inclined away from the windscreen and from the observer so that air flow towards it from the observer gives rise to a force urging the rubber towards the windscreen. The edges of the shroud are not intended to touch the windscreen but may do so during a part of the wiper stroke.

An example of a wiper blade according to the present invention is shown in the accompanying drawings.

In the drawings:

FIGURE 1 is a perspective view of the blade; and
FIGURE 2 is a sectional view on the line II—II in FIGURE 1.

The blade shown in the drawings includes a harness made up of yokes 2, 4 and 6 pivoted together. The yoke 2 is shown pivoted to a wiper arm 7 (partly shown).

The ends of the yokes have claws 8 which extend through openings in a shroud 10 and engage a backing strip for a rubber 12, the backing strip being in the form of two flexible strips of metal 14 joined at longitudinal intervals by integral bridges 16 sheared from the metal of the strips. A bead 18 on the rubber is anchored in the backing strip and permits a body 20, at the end of which there is a wiping edge 22, to rock during wiping, as shown in dotted lines.

The shroud 10 is trough-shaped with diverging side walls and passes over the top of the backing strip and rubber, as shown in FIGURE 2. It grips the outside edges of the backing strip throughout its length as a result of the engagement of the edges of the backing strip in opposed longitudinal grooves 24 in the shroud.

Transverse ribs 26 are formed at longitudinal intervals on the outer surface of the shroud, and similar ribs 28 are formed on the inner surface of the shroud. These ribs reduce longitudinal air flow along the shroud, and also assist in making the shroud self-supporting, that is to say sufficiently stiff to ensure that the sides cannot sag appreciably under their own weight.

Since the shroud must flex with the backing strip and rubber towards and away from the windscreen when the blade moves onto a curved part of a windscreen, it is necessary to choose a material which, though making the shroud self-supporting, does not give rise to too great a resistance to flexing. Deformable materials of the class known broadly as "plastics" are preferred, examples being polyvinyl chloride and polythene of appropriate hardnesses.

In the example shown in the drawings the dimension "X" is 0.035 of an inch. The walls of the shroud may, however, be thinner with a dimension "X" as small as 0.01 of an inch.

I claim:

1. A curved windscreen wiper blade including a pressure distributing harness having relative movable members, an elongated rubber of which a substantial part will rock with respect to the harness to opposite sides of a central position when the blade is in use, a flexible surface conforming backing strip acted upon by said harness, and a thin self-supporting shroud of a deformable moulded material capable of following the flexing of the strip and lying along the length of the blade to shield from air flow across the windscreen of a vehicle a substantial part of the rocking part of the rubber at least on one side, said shroud being connected operatively to follow the surface conforming action of the backing strip at least in a number of longitudinally spaced positions.

2. A wiper blade according to claim 1 in which the shroud shields a substantial part of the rocking part of the rubber from air flow across the windscreen on both sides.

3. A wiper blade according to claim 2 in which the sides of the shroud diverge away from the harness of the blade and are provided with opposing recesses in which the opposite side margins of the backing strip supportingly engage.

4. A wiper blade according to claim 2 in which the shroud passes over the top of the backing strip and rubber and grips the backing strip at both outside edges, at least at a number of longitudinally spaced regions, and in which claws on the harness engaging the backing strip pass through openings in the shroud.

5. In a wiper blade according to claim 1, said shroud comprising an inverted trough-shaped length of contour deformable moulded material, of which the wiper enclosing sides are self-supporting, with opposed internal longitudinal grooves in the side walls for supportingly receiving the edges of a surface-conforming wiper backing strip, and with one or more openings for the claws of a harness.

6. A wiper blade according to claim 5 wherein said shroud includes longitudinally spaced transverse ribs resisting longitudinal airflow along the shroud.

7. A curved windscreen wiper blade comprising a flexible rubber having a wiping edge along one margin and an anchoring part along its opposite margin, a surface-conforming backing strip supporting the rubber by its anchoring part for conforming the wiping edge to a windscreen surface, and a flexible and self-supporting shroud of substantially trough shape in cross section inverted over the anchoring part and backing strip and having inner side walls supportingly engaging the side edges of the backing strip for following its surface-conforming action, said backing strip being inflexible transversely of the rubber and affording like lateral sustaining support for the flexible shroud, said shroud flexing with the surface-conforming backing strip and extending along the length of the rubber to shield from air flow across the windscreen surface a substantial part of the wiping edge portion below the backing strip.

8. A windscreen wiper blade according to claim 7, wherein the wiping edge portion of the rubber beneath the surface conforming backing strip is free to flex sidewise within the shroud.

9. A windscreen wiper blade according to claim 8, wherein a pressure applying harness has longitudinally spaced claw means penetrating the shroud and holding the surface-conforming backing strip in its operative position within the shroud for responding to a windscreen surface contour.

10. In a wiper blade according to claim 1, said shroud for a flexible curved wiper blade, comprising a flexible surface conforming body for enclosing the blade, the material of the shroud being of polythene.

11. In a wiper blade according to claim 1, said shroud comprising a flexible surface conforming body for enclosing the blade, the material of the shroud being of polyvinyl chloride.

References Cited in the file of this patent

UNITED STATES PATENTS

| | | |
|---|---|---|
| 1,641,336 | Klapper | Sept. 6, 1927 |
| 2,006,322 | Horton | June 25, 1935 |
| 2,194,109 | Bader | Mar. 19, 1940 |
| 2,649,605 | Scinta et al. | Aug. 25, 1953 |